(12) United States Patent
Brinkman et al.

(10) Patent No.: US 6,683,856 B1
(45) Date of Patent: Jan. 27, 2004

(54) METHOD AND APPARATUS FOR MEASURING NETWORK PERFORMANCE AND STRESS ANALYSIS

(75) Inventors: Thomas Edwin Brinkman, Naperville, IL (US); Robert Joseph Hanson, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/169,596

(22) Filed: Oct. 9, 1998

(51) Int. Cl.$^7$ ................................................ G01R 31/08
(52) U.S. Cl. ........................ 370/249; 370/248; 703/13; 703/23
(58) Field of Search ................................ 370/235, 236, 370/236.2, 241.1, 252, 249, 253, 248; 709/100; 703/13, 14, 23, 24

(56) References Cited

U.S. PATENT DOCUMENTS

| | | | | |
|---|---|---|---|---|
| 5,450,394 A | * | 9/1995 | Gruber et al. | 370/253 |
| 5,563,875 A | * | 10/1996 | Hefel et al. | 370/248 |
| 5,740,159 A | * | 4/1998 | Ahmad et al. | 370/246 |
| 5,793,976 A | * | 8/1998 | Chen et al. | 370/252 |
| 5,878,032 A | * | 3/1999 | Mirek et al. | 370/252 |
| 6,023,455 A | * | 2/2000 | Takahashi | 370/249 |
| 6,052,726 A | * | 4/2000 | Fontenot | 370/252 |
| 6,097,699 A | * | 8/2000 | Chen et al. | 370/231 |

OTHER PUBLICATIONS

Douglas E. Comer, Internetworking With TCP/IP, vol. 1, Principles, Protocols, and Architecture, 102–106 (2d Ed. 1991).

Douglas, E. Comer, The Internet, Everything You Need to Know About Computer Networking and How the Internet Works, 293 (2d Ed. 1997).

Tracert specification, from Windows 95 Resource Kit (undated).

Traceroute command, Douglas E. Comer, Internetworking With TCP/IP, vol. 1, Principles, Protocols, and Architecture, 586 (3d Ed. 1995).

* cited by examiner

*Primary Examiner*—Douglas Olms
*Assistant Examiner*—Bob A. Phunkulh

(57) ABSTRACT

A method and apparatus for measuring network performance and performing stress analysis are disclosed. The disclosed method and apparatus measure system delays through a network while selectively placing loads on nodes in the network. Each node in the network recognizes and processes a directed load/performance message (DLP) that travels along a specified route and measures the delays within the network. The directed load/performance message is a self-guided packet that traverses the network along a path specified by the initiator of the message. Each node inserts its current (local) time into the directed load/performance message as the node processes the DLP message on both the forward and reverse legs of the specified path. The delay seen by each node in the network can be obtained by subtracting the time-stamps inserted in the message by each node as the node processes the message in each direction. The "round trip time" is the time it takes the message to leave and return to the same node in the round trip path. The round trip time provides the delay seen by a given node. The incremental delay time is the time it takes for the message to travel between two adjacent nodes on a given leg of the path. Various load conditions can be simulated on specified nodes in the network, to observe the behavior of the node under stress. The DLP message can optionally indicate a predefined number of CPU cycles that each node should burn (or consume) in order to simulate a load.

26 Claims, 3 Drawing Sheets

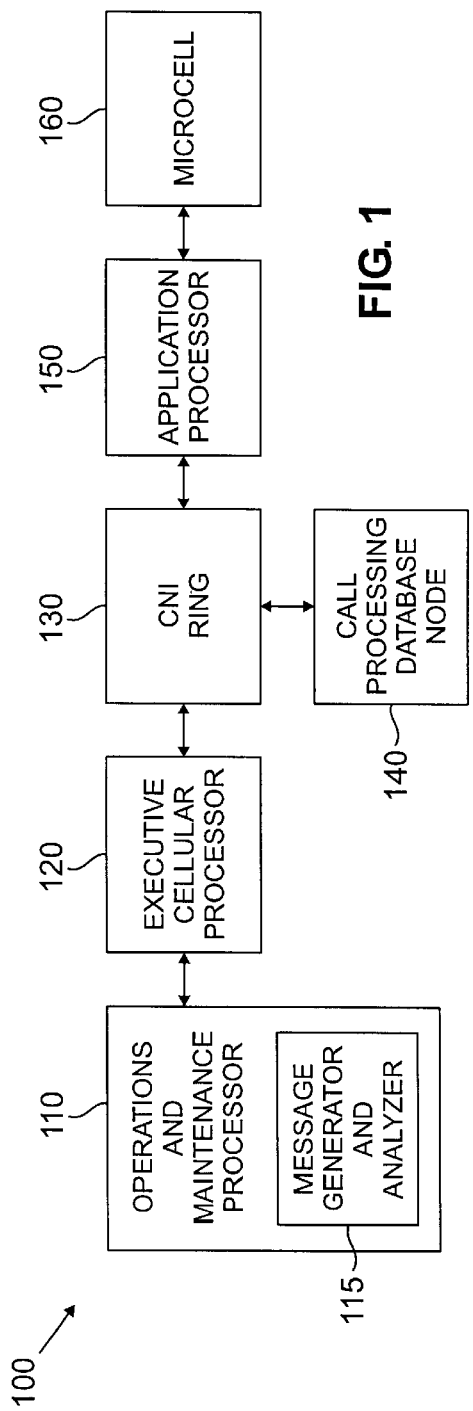

US 6,683,856 B1

METHOD AND APPARATUS FOR MEASURING NETWORK PERFORMANCE AND STRESS ANALYSIS

FIELD OF THE INVENTION

The present invention relates to network testing and diagnostic tools, and more particularly, to an improved method and apparatus for measuring the performance of a network under normal and heavy load conditions.

BACKGROUND OF THE INVENTION

A number of network testing and diagnostic tools have been developed or proposed to evaluate routes in a communication network and thereby prevent network breakdowns and improve system performance. The TraceRT™ tool in Windows 95™ or the traceroute command in UNIX™, for example, allows a user to view the topology of a particular network connection and sends a message through the network along the specified route. Each node along the route inserts the current local time into the message (relative to a predefined standard time) and forwards the message to the next node in the specified path.

Since the various nodes in the network are a loosely connected network of independent processors, there is no time synchronization accurate to the levels required to measure sub-millisecond delays and time. Thus, it is difficult to identify where a given message slows down along a particular route. In addition, the clock differences between various nodes may cause the inter-node time to be a negative number. In addition, the TraceRT™ tool does not permit a load to be created on the system that will simulate the workload that the system would see under normal operating conditions. Although load generators have been used with some success in the laboratory environment, these tools are costly to simulate a heavy load, and are not feasible to use in a field environment.

As apparent from the above-described deficiencies with conventional network testing and diagnostic tools, a need exists for a network testing and diagnostic tool that accurately measures the performance of a network or system under normal and heavy load conditions. A further need exists for a testing and diagnostic tool that measures the delays through a specified route in a network. Yet another need exists for a testing and diagnostic tool that generates a load on specific elements in the network or system and measures the system reaction.

SUMMARY OF THE INVENTION

Generally, a method and apparatus are disclosed for measuring network performance and performing stress analysis. The present invention allows system delays through a network to be measured while selectively placing loads on nodes in the network. According to a feature of the present invention, each node in the network recognizes and processes a directed load/performance message (DLP) that travels along a specified route and measures the delays within the network. The directed load/performance message (DLP) is a self-guided packet that traverses the network along a path specified by the initiator of the message and then returns to the message initiator by means of the same routing in the reverse direction.

According to one aspect of the invention, each node inserts its current (local) time into the directed load/performance message (DLP) as the node processes the DLP message on both the forward and reverse legs of the specified path. Although the clocks in each node are generally not synchronized to each other, the delay seen by each node in the network can be obtained by subtracting the time-stamps inserted in the message by each node as the node processes the message in each direction. The "round trip time" is the time it takes the message to leave and return to the same node in the round trip path. Thus, the round trip time provides the highly accurate delay seen by a given node. The incremental delay time is the time it takes for the message to travel between two adjacent nodes on a given leg of the path.

According to another aspect of the invention, heavy load and overload conditions can be simulated on specific nodes in the network, to observe the behavior of the node under stress. The DLP message can optionally indicate a predefined number of CPU cycles or CPU consumption specified in selected time units that each node should burn (or consume) in order to simulate a load. Thus, stress analysis can be performed without expensive load generation hardware in a more efficient manner.

The present invention allows network delays to be measured between two nodes without writing specific software code. A DLP message can be launched that passes through the nodes of interest, collects desired round trip information and returns the results to the initiator. In one implementation, a non-critical node can be used as a test bed to evaluate the performance of critical nodes.

A more complete understanding of the present invention, as well as further features and advantages of the present invention, will be obtained by reference to the following detailed description and drawings.

BRIEF DESCRIPTION OF THE DRAWINGS

FIG. 1 illustrates a representative network environment that may be tested in accordance with the present invention;

FIGS. 2A and 2B are tabular representations of a directed load/performance message (DLP) in accordance with the present invention, prior to and following transmission through the network of FIG. 1, respectively;

DETAILED DESCRIPTION

Figure 2B:
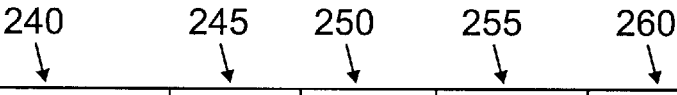

FIG. 1 illustrates a representative network environment 100 comprised of a plurality of nodes 110, 120, 130, 140, 150, 160, that may be tested in accordance with the present invention. In the illustrative network configuration, network delays are measured between an operations and maintenance processor (OMP) 110 and a channel element in a Code Division Multiple Access (CDMA) microcell 160. The particular nodes 110, 120, 130, 140, 150, 160 shown in FIG. 1 are merely illustrative of the principles of the invention, and can be replaced by any processing node, as would be apparent to a person of ordinary skill.

The present invention allows the performance of the network 100 to be measured. The load on the network 100 can be controlled, and specific nodes 110, 120, 130, 140, 150, 160 in the network 100 can be evaluated under normal or stressed conditions. Generally, the present invention allows system delays through the network 100 to be measured while selectively placing loads on nodes 110, 120, 130, 140, 150, 160.

According to a feature of the present invention, each node 110, 120, 130, 140, 150, 160 in the network 100 recognizes and processes a directed load/performance message (DLP), discussed further below in conjunction with FIGS. 2A and 2B, that measures the delays within the network 100. The directed load/performance message (DLP) is a self-guided packet that traverses the network 100 along the path specified by the initiator of the message. In one implementation, each node 110, 120, 130, 140, 150, 160 recognizes and processes a directed load/performance message (DLP) in accordance with a DLP message handling process 400, discussed below in conjunction with FIG. 4.

According to a further feature of the invention, each node inserts its current time into the directed load/performance message (DLP) as the node processes the message on both the forward and reverse legs of the specified path. Although the clocks in each node 110, 120, 130, 140, 150, 160 are generally not synchronized to each other, the delay seen by each node in the network can be obtained by subtracting the time-stamps inserted in the message by each node as it processes the message in each direction. Since the round trip time entries are based on the same local clock for a given node, they are accurate to less than a millisecond and can be used for network evaluation. As used herein, the "round trip time" is the time it takes the message to leave and return to the same node in the round trip path. Thus, the round trip time provides the delay seen by a given node. In addition, the incremental delay time is the time it takes for the message to travel between two adjacent nodes on a given leg of the path. The incremental delay values obtained by the present invention can be evaluated by existing network diagnostic tools to more precisely identify the source of network delays.

Generally, each node 110, 120, 130, 140, 150, 160 of the network 100 examines the structure of the received message, performs the requested work, logs the results in the message, and forwards the message to the next indicated node. As the message returns to the initiator, the message will contain the results of all the work performed, so that the initiator can process and analyze the information.

As shown in FIG. 1, an operations and maintenance processor (OMP) 110 is the initiator of the message in the illustrative embodiment. The operations and maintenance processor (OMP) 110 (and any other node that initiates directed load/performance messages) includes a message generator and analyzer 115 that (i) determines the desired path through the network 100, (ii) forms the message in a manner described below in conjunction with FIG. 2A, (iii) forwards the message to the appropriate next node, and (iv) analyzes the results contained in the message upon completion. It is noted that the initiator 110 may have to determine the network topology in a known manner, before determining the path through the network.

FIGS. 2A and 2B provide tabular representations of a directed load/performance message (DLP) in accordance with the present invention. It is noted that the format of the directed load/performance message (DLP) shown in FIGS. 2A and 2B is merely illustrative of the principles of the present invention. The directed load/performance message (DLP) of FIG. 2A corresponds to a point in time before the message has been routed through the network 100, while the directed load/performance message (DLP) of FIG. 2B corresponds to a point in time after the message has been completely routed through the following transmission through the network of FIG. 1. The directed load/performance message (DLP) may be constructed to allow each node in the network 100 to process the message much like a normal traffic message.

As shown in FIG. 2A, the directed load/performance message (DLP) includes a plurality of records, such as records 205–230, each associated with a different network node along the specified route through the network. For each network node identified in field 240, the directed load/performance message (DLP) includes a field for recording the current time the message is received in both the forward and reverse directions, in fields 245 and 250, respectively, as well as any load (CPU cycles) that should be simulated by the node in both the forward and reverse directions, in fields 255 and 260, respectively. It is noted that although the directed load/performance message (DLP) of FIG. 2A shows addresses based on hardware, the technique could also include software entities that may run on the same hardware platform. In addition, Internet Protocol (IP) addresses are also possible, allowing messages to be routed to any IP compliant software entity.

Figure 3:
FIG. 3 is an analysis table that records the round trip and incremental delay times of the message of FIGS. 2A and 2B through the network of FIG. 1.

The analysis table set forth in FIG. 3 records the round trip and incremental delay times of the message of FIGS. 2A and 2B through the network of FIG. 1. As shown in FIG. 3, the analysis table includes a plurality of records, such as records 305–330, each associated with a different network node along the specified route through the network. For each network node identified in field 340, the analysis table indicates the round trip time and incremental delay time corresponding to each node in fields 345 and 350, respectively. The round trip time is the time it takes the message to leave and return to the same node in the round trip path. In other words, the round trip time is obtained by subtracting the values in fields 245 and 250 of the directed load/performance message (DLP) for each node. The incremental delay time is the time it takes for the message to travel between two adjacent nodes on a given leg of the path. In other words, the incremental delay time is obtained by subtracting the round trip values in field 345 of the analysis table for two adjacent nodes.

Figure 4:
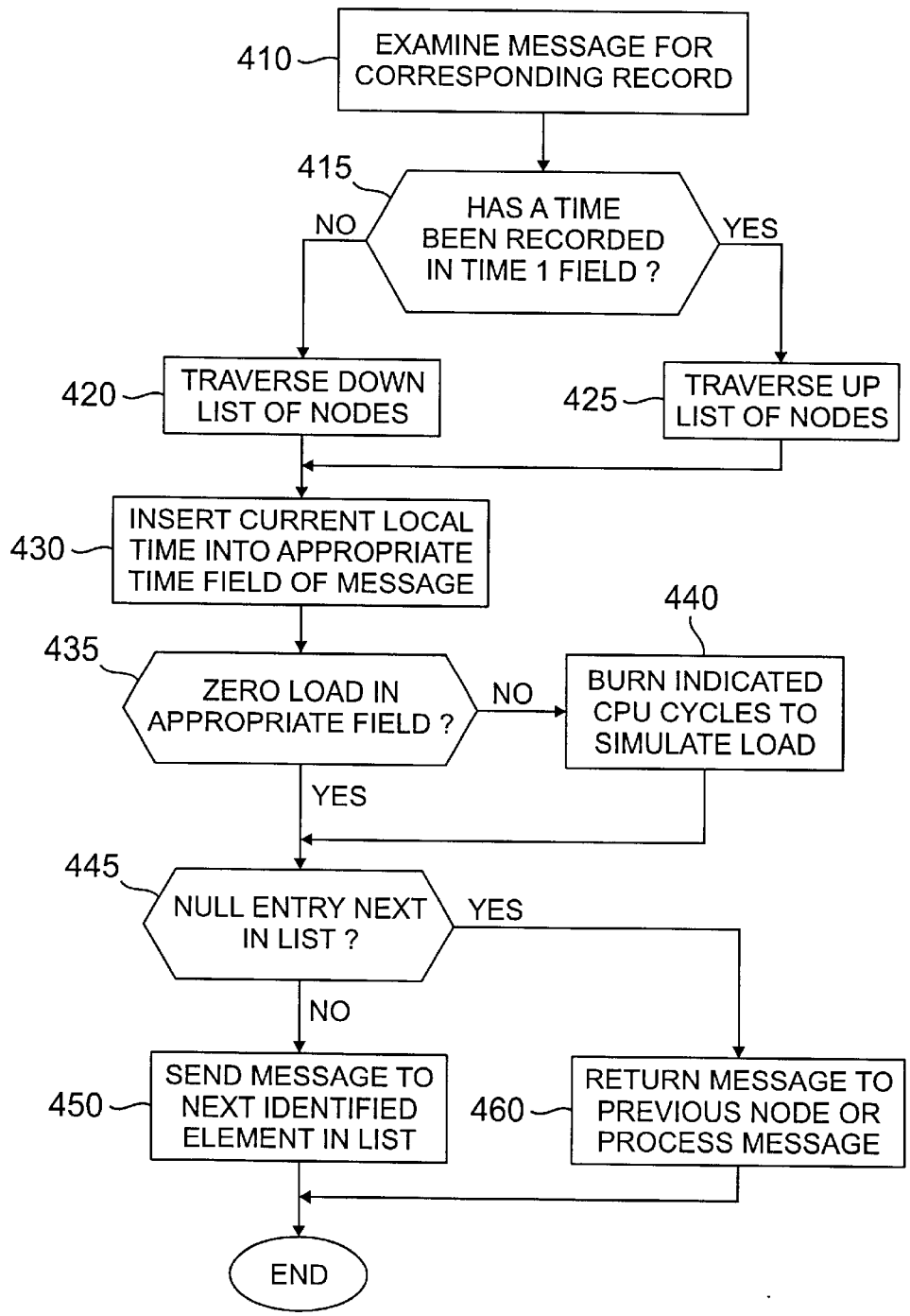
FIG. 4 is a flow chart describing an exemplary DLP message handling process implemented by each of the nodes in the network of FIG. 1.

As previously indicated, each node 110, 120, 130, 140, 150, 160 in the network 100 recognizes and processes a directed load/performance message (DLP) in accordance with a DLP message handling process 400, shown in FIG. 4. As shown in FIG. 4, the DLP message handling process 400 initially examines the record in a received message for the corresponding node during step 410. A test is performed during step 415 to determine if a time entry has been recorded in the Time 1 field 245 of the directed load/performance message (DLP). If it is determined during step 415 that a time entry has not been recorded in the Time 1 field 245 of the directed load/performance message (DLP), then this is the forward leg of the message, and the process 400 will traverse down the list of nodes in the directed load/performance message (DLP) during step 420. If, however, it is determined during step 415 that that a time entry has been recorded in the Time 1 field 245 of the directed load/performance message (DLP), then this is the reverse leg of the message, and the process 400 will traverse up the list of nodes in the directed load/performance message (DLP) during step 425.

Thereafter, the process 400 inserts the current local time into the appropriate time field 235 or 250 of the directed load/performance message (DLP) during step 430. A test is performed during step 435 to determine if a load value is indicated in the appropriate field 255 or 260 of the directed load/performance message (DLP). If it is determined during step 435 that a load value is indicated in the appropriate field 255 or 260 of the directed load/performance message (DLP), then the indicated number of CPU cycles will be burned during step 440 to simulate a load. For example, if a processing node would normally perform a table look-up, as well as validity and security checks in processing a call, that are estimated to take 100 microseconds, the node will be instructed to burn 100 microseconds to simulate the load. The CPU consumption time may be any time unit agreed upon in the particular implementation for all the nodes. For example, the CPU consumption time may be specified in machine cycles, nanoseconds, or microseconds.

If it is determined during step 435 that a load value is not indicated in the appropriate field 255 or 260 of the directed load/performance message (DLP), then program control will proceed directly to step 445. A test is performed during step 445 to determine if a null entry exists in the next entry in the list of nodes in the directed load/performance message (DLP). If it is determined during step 445 that a null entry does not exist in the next entry in the list, then the message is sent to the next identified element in the list during step 450. If, however, it is determined during step 445 that a null entry exists in the next entry in the list, then the current node is either the last node along the route (the destination) or is the message initiator. Thus, the message will be returned to the previous element in the list (if destination) or processed by the initiator, as appropriate, during step 460, before program control terminates.

EXAMPLE

The directed load/performance message (DLP) shown in FIG. 2A has been designed to traverse the network shown in FIG. 1. The operations and maintenance processor (OMP) 110 initially creates the directed load/performance message (DLP), puts the current time in the Time 1 field 245 of record 205 and sends the message to the next node in the list, the executive cellular processor (ECP) 120. The executive cellular processor (ECP) 120 examines the message, puts the current time in the Time 1 field 245 of record 210 and sends the message to the next node in the list, the call processing database node (CDN) 140. The call processing database node (CDN) 140 examines the message, puts the current time in the Time 1 field 245 of record 215 and sends the message to the next node in the list, the application processor (AP) 150. The application processor (AP) 150 examines the message, puts the current time in the Time 1 field 245 of record 220, and seeing the non-zero value in the Load 1 field 255, calls a routine to burn 100 microseconds of CPU cycles to simulate load, before sending the message to the next node in the list, the microcell 160. The microcell 160 examines the message, puts the current time in the Time 1 field 245 of record 225, determines that the next address is null and returns the message to the previous node in the list, the application processor (AP) 150.

The application processor (AP) 150 receives the message, notes that Time 1 field 245 is populated, indicating that the message is now in the reverse direction, inserts its current time in Time 2 field 250, and seeing the non-zero value in the Load 2 field 260, calls a routine to burn 50 microseconds of CPU cycles to simulate load, before sending the message to the previous node in the list, the call processing database node (CDN) 140. The call processing database node (CDN) 140 populates the Time 2 field 250 with its current time and sends the message to the previous node in the list, the executive cellular processor (ECP) 120. The executive cellular processor (ECP) 120 populates the Time 2 field 250 with its current time and sends the message to the previous node in the list, the operations and maintenance processor (OMP) 110. The operations and maintenance processor (OMP) 110 populates the Time 2 field 250 and gives the message back to the initiator. Once the directed load/performance message (DLP) has completed this path, it will look like the directed load/performance message (DLP) shown in FIG. 2B.

The operations and maintenance processor (OMP) 110 can process the information contained in the directed load/performance message (DLP) shown in FIG. 2B, to determine the round trip and incremental delay times, as shown in FIG. 3. For example, the round trip delay time for the message to leave and return to the operations and maintenance processor (OMP) 110 in the round trip path is 119 milliseconds. Likewise, the incremental delay time for the message to travel between the operations and maintenance processor (OMP) 110 and the executive cellular processor (ECP) 120 on a given leg of the path is 47 milliseconds (obtained by subtracting the round trip delay time of the executive cellular processor (ECP) 120 from the round trip delay time of the operations and maintenance processor (OMP) 110).

It is to be understood that the embodiments and variations shown and described herein are merely illustrative of the principles of this invention and that various modifications may be implemented by those skilled in the art without departing from the scope and spirit of the invention.

We claim:

1. A method performed by a network node for measuring network performance, said method comprising the steps of:
   receiving a message that traverses said network along a specified path and then returns by means of the same route in the reverse direction, said path including a plurality of network nodes;
   inserting current local time in said message for each direction of said specified path;
   simulating a load at one or more of said network nodes; and
   forwarding said message to the next node along said specified path for each direction of said round trip path.

2. The method according to claim 1, wherein said message further indicates a selected time duration of CPU to be consumed by one or more of said nodes to simulate said load.

3. The method according to claim 1, wherein said message indicates a list of network nodes in said round trip path.

4. The method according to claim 1, wherein said message indicates a list of network nodes in a round trip path.

5. The method according to claim 1, wherein said message includes a field corresponding to each of said nodes for recording the current local time for each direction of said specified path.

6. The method according to claim 1, further comprising the step of determining a round trip time delay for said node by subtracting said current local times for each direction of said specified path.

7. The method according to claim 6, further comprising the step of determining an incremental delay time for said node by subtracting the round trip delay times of two adjacent nodes along said specified path.

8. A method for measuring performance of a network, said method comprising the steps of:
   generating a message that traverses said network along a specified path and then returns by means of the same route in the reverse direction, said path including a plurality of network nodes, each of said nodes inserting a current local time in said message for each direction of said round trip path;

simulating a load at one or more of said network nodes; and processing said round trip times in said message to determine the delay seen by one or more of said nodes.

9. The method according to claim 8, wherein said message further indicates a number of CPU cycles to be consumed by one or more of said nodes to simulate said load.

10. The method according to claim 8, wherein said message further indicates a selected time duration of CPU to be consumed by one or more of said nodes to simulate said load.

11. The method according to claim 8, wherein said message indicates a list of network nodes in said round trip path.

12. The method according to claim 8, wherein said message includes a field corresponding to each of said nodes for recording the current local time for each direction of said specified path.

13. The method according to claim 8, further comprising the step of determining a round trip time delay for one or more of said nodes by subtracting said current local times for each direction of said specified path.

14. The method according to claim 13, further comprising the step of determining an incremental delay time for one or more of said nodes by subtracting the round trip delay times of two adjacent nodes along said specified path.

15. A network node comprising:
means for receiving a message that traverses said network along a specified path and then returns by means of the same route in the reverse direction, said path including a plurality of network nodes; and a processor operatively coupled to said means for receiving, said processor configured to:
insert a current local time in said message for each direction of said specified path;
simulate a load at one or more of said network nodes; and
forward said message to the next node along said specified path for each direction of said specified path.

16. The method according to claim 15, wherein said message further indicates a number of CPU cycles to be consumed by one or more of said nodes to simulate said load.

17. The method according to claim 15, wherein said message further indicates a selected time duration of CPU to be consumed by one or more of said nodes to simulate said load.

18. The network node according to claim 15, wherein said message indicates a list of network nodes in said round trip path.

19. The network node according to claim 15, wherein said processor determines a round trip time delay by subtracting said current local times for each direction of said specified path.

20. The network node according to claim 19, wherein said processor determines an incremental delay time for said node by subtracting the round trip delay times of two adjacent nodes along said specified path.

21. A system for measuring performance of a network, said network comprising a plurality of network nodes, said system comprising:
means for communicating with at least one of said network nodes;
a processor operatively coupled to said means for communicating, said processor configured to:
generate a message that traverses said network along a specified path and then returns by means of the same route in the reverse direction, said path including a plurality of said network nodes, each of said nodes inserting a current local time in said message for each direction of said round trip path;
simulate a load at one or more of said network nodes; and
determine the delay seen by one or more of said nodes based on said current local times.

22. The method according to claim 21, wherein said message further indicates a number of CPU cycles to be consumed by one or more of said nodes to simulate said load.

23. The method according to claim 21, wherein said message further indicates a selected time duration of CPU to be consumed by one or more of said nodes to simulate said load.

24. The system according to claim 21, wherein said message indicates a list of network nodes in said round trip path.

25. The system according to claim 21, wherein said processor determines a round trip time delay for one or more of said nodes by subtracting said current local times for each direction of said specified path.

26. The system according to claim 25, wherein said processor determines an incremental delay time for one or more of said nodes by subtracting the round trip delay times of two adjacent nodes along said specified path.

* * * * *

UNITED STATES PATENT AND TRADEMARK OFFICE
CERTIFICATE OF CORRECTION

PATENT NO. : 6,683,856 B1
DATED : January 27, 2004
INVENTOR(S) : Thomas E. Brinkman and Robert J. Hanson It is certified that error appears in the above-identified patent and that said Letters Patent is hereby corrected as shown below:

<u>Column 6,</u>
Line 35, after "inserting" and before "current" insert -- a --.
Line 46, replace "indicates a list of network nodes in said round trip path." with -- further indicates a number of CPU cycles to be consumed by one or more said nodes to simulate said load. --.
Line 49, after "in" and before "round" replace "a" with -- said --.

Signed and Sealed this

Twentieth Day of September, 2005

JON W. DUDAS
*Director of the United States Patent and Trademark Office*